(12) United States Patent
Agam et al.

(10) Patent No.: US 8,689,624 B2
(45) Date of Patent: Apr. 8, 2014

(54) LEVEL SENSOR SYSTEM FOR PROPANE TANKS AND OR THE LIKES

(76) Inventors: Uri Agam, Montréal (CA); Pino Marcovecchio, Montréal (CA)

( * ) Notice: Subject to any disclaimer, the term of this patent is extended or adjusted under 35 U.S.C. 154(b) by 224 days.

(21) Appl. No.: 12/452,802

(22) PCT Filed: Jul. 4, 2008

(86) PCT No.: PCT/CA2008/001234
§ 371 (c)(1),
(2), (4) Date: Jan. 21, 2010

(87) PCT Pub. No.: WO2009/026672
PCT Pub. Date: Mar. 5, 2009

(65) Prior Publication Data
US 2010/0126267 A1    May 27, 2010

Related U.S. Application Data

(60) Provisional application No. 60/969,038, filed on Aug. 30, 2007.

(51) Int. Cl.
*G01F 23/296*    (2006.01)
(52) U.S. Cl.
USPC ........................................... 73/290 V
(58) Field of Classification Search
USPC ........................................... 73/290 V
See application file for complete search history.

(56) References Cited

U.S. PATENT DOCUMENTS

| | | | | |
|---|---|---|---|---|
| 4,182,177 A | * | 1/1980 | Prough | 73/290 V |
| 4,901,245 A | * | 2/1990 | Olson et al. | 702/54 |
| 5,095,748 A | * | 3/1992 | Gregory et al. | 73/290 V |
| 5,586,085 A | * | 12/1996 | Lichte | 367/99 |
| 5,755,136 A | * | 5/1998 | Getman et al. | 73/290 V |
| 6,047,598 A | * | 4/2000 | Otto et al. | 73/290 V |
| 6,246,154 B1 | | 6/2001 | Gluszyk et al. | |
| 6,397,656 B1 | * | 6/2002 | Yamaguchi et al. | 73/1.82 |
| 7,114,390 B2 | | 10/2006 | Lizon et al. | |

(Continued)

FOREIGN PATENT DOCUMENTS

| CA | 2 142 740 | | 8/1995 |
|---|---|---|---|
| EP | 0 955 529 | A1 | 11/1999 |
| EP | 1 748 285 | A1 | 1/2007 |

*Primary Examiner* — Hezron E Williams
*Assistant Examiner* — Mark A Shabman
(74) *Attorney, Agent, or Firm* — Agence de Brevets Fournier; Claude Fournier (57) ABSTRACT

A level sensor system according to the present invention includes a controller and a sensor assembly defined by a transducer assembly and a mounting assembly configured for a quick connection or non permanent attachment of the transducer assembly to the tank or container. The ultrasound transducer assembly emits ultrasound pulses in the tank along a detecting path, receives ultrasound echoes indicative of at least one of the first and second fluids and produces echo signals representative of the at least one of the first and second fluids. The mounting assembly is configured for receiving the ultrasound transducer assembly and for operatively mounting the ultrasound transducer assembly to the tank for ultrasound measurement. The controller is coupled to the ultrasound transducer assembly, receives the echo signals and determines the position of the fluid interface therewith; the level of the first fluid being defined by the position of the fluid interface. The fact that the sensor assembly is configured so as to be removably mounted to the tank allows replacing the tank, for example when it is empty, without having to replace the sensor assembly.

11 Claims, 10 Drawing Sheets

(56) References Cited

U.S. PATENT DOCUMENTS

| | | |
|---|---|---|
| 2004/0173021 A1 | 9/2004 | Lizon et al. |
| 2007/0180903 A1* | 8/2007 | Gao .......................... 73/290 V |
| 2007/0214880 A1 | 9/2007 | Spanke et al. |
| 2009/0205419 A1 | 8/2009 | Volkwein et al. |

* cited by examiner

LEVEL SENSOR SYSTEM FOR PROPANE TANKS AND OR THE LIKES

This is a national stage appliacation under 35 U.S.C. 371, of International application No. PCT/CA2008/001234, filed on Jul. 4, 2008, which claims priority from U.S provisional application No. 60/969,038, filed on Aug. 30, 2007.

FIELD

The present invention concerns fluid level measuring in a closed container, such as a propane tank, using ultrasound.

BACKGROUND

Many methods and systems are known to measure the fluid level in a container, including those using ultrasounds.

Since ultrasound measurements often require a tight coupling between the transducer assembly and the container, a drawback of current level sensor system from the prior art that are adapted for pressurized tanks or tanks including corrosive liquids or gas is that the ultrasound transducer assembly is directly mounted to the container or inside the container in a housing which buffers between the transducer and the liquid. Thereby, such a system is not adapted to be used on a plurality of different tanks or containers.

BRIEF DESCRIPTION OF THE DRAWINGS

In the appended drawings:

FIGS. 10 and 11 are schematic sectional views of a sensor assembly according to a ninth illustrated embodiment of the present invention, illustrating the use of a reflector between the transducer and the bottom of the tank for maximum fill level detection for example; FIG. 10 showing the path between the reflector and the transducer being partially immersed, while FIG. 11 shows the path between the reflector and the transducer completely immersed;

DETAILED DESCRIPTION

The present invention concerns a level sensor system and more specifically a level sensor assembly to measure the level of corrosive and or pressurized liquid in a tank or container such as in a propane tank or, in a natural gas tank, or to measure the level of coolant liquid or others. The present level sensor system includes a transducer assembly and processing electronics to be secured to the container outside or inside thereof, for continued level measurement and or a switch or multiple switches operation.

As will be described furtherin, the level sensor system according to the present invention comprises a controller and a sensor assembly defined by a transducer assembly and a mounting assembly configured for a quick connection or non permanent attachment of the transducer assembly to the tank or container. The fact that the sensor assembly is configured so as to be removably mounted to the tank allows replacing the tank, for example when it is empty, without having to replace or reconfigure the sensor assembly. For example, if one wishes to use the sensor system on certain hardware such as a barbecue tank and replace the container from time to time, one can do so without having to change the sensor.

As will be explained hereinbelow in more detail, the sensor assembly according to the present invention can be configured for example for direct connection to the tank or for tight coupling therewith when the container is positioned adjacent thereto.

More specifically, in accordance with a first aspect of the present invention, there is provided a level sensor system for measuring the level of a first fluid in a tank, the first fluid defining a fluid interface with a second fluid, the system comprising an ultrasound transducer assembly for emitting ultrasound pulses in the tank along a detecting path, for receiving ultrasound echoes indicative of at least one of the first and second fluids and for receiving echo signals representative of the at least one of the first and second fluids;

a controller coupled to the ultrasound transducer assembly for receiving the echo signals and for determining a position of the fluid interface therewith; the level of the first fluid being defined by the position of the fluid interface; and a mounting assembly for receiving the ultrasound transducer assembly and for operatively mounting the ultrasound transducer assembly to the tank for ultrasound measurement.

According to a second aspect of the present invention, there is provided a level sensor assembly for measuring the level of a first fluid in a tank, the first fluid defining a fluid interface with a second fluid, the system comprising:

an ultrasound transducer assembly for emitting ultrasound pulses in the tank along at least one detecting path, for receiving ultrasound echoes indicative of at least one of the first and second fluids and for receiving echo signals representative of the at least one of the first and second fluids; and a mounting assembly for receiving the ultrasound transducer assembly and for operatively mounting the ultrasound transducer assembly to the tank for ultrasound measurement.

The first fluid is, for example, a liquid in the tank, while the second fluid is a gas above the liquid.

According to a more specific embodiment of the present invention, the echo signal representative of the at least one of the first and second fluids is representative of the interface between the first and second fluids.

The time of flight of the ultrasound pulse and reflected echoes is indicative of the fluid level.

Other objects, advantages and features of the present invention will become more apparent upon reading the following non restrictive description of illustrated embodiments thereof, given by way of example only with reference to the accompanying drawings.

In the following description, similar features in the drawings have been given similar reference numerals, and in order not to weigh down the figures, some elements are not referred to in some figures if they were already identified in a precedent figure.

A level sensor system 10 for measuring the level of propane in a conventional BBQ propane tank 11 according to a first illustrative embodiment of the present invention will now be described with reference to FIGS. 1-2.

The level sensor system 10 comprises a sensor assembly 12 including an ultrasound transducer 14 and a mounting assembly 18 for operatively mounting the transducer 14 to the tank 11 for level measurement, a controller 16 coupled to the ultrasound transducer 14, and a display output device, in the form of a LCD module 20, which is coupled to the controller 16. Each of these components of the system 10 will now be described in more details.

The controller 16 is in the form of a printed circuit board (PCB) which includes conventional excitation electronics to drive the transducer 14 in pulse mode, an amplifier processor and a conventional connector 17 to receive the liquid crystal display (LCD) module 20. Both the excitation electronics and amplifier can be provided with control electronics that change the amount of excitations (duration and amplitude).

The PCB 16 receives echo signals from the transducer 14 and uses known algorithms to determine the position of the interface between the liquid in the tank 11 and the gas thereabove. The PCB 16 calculation includes computing the delay between the transducer 14 excitation and the reflected signal (echo) from the interface of the liquid and the gas above the liquid. This delay is known in the art as the Time of Flight (TOF). When frequent measurements are performed and/or when the position of the liquid level can be approximated before measurement, a windowing technique can further be implemented to minimize false measurements.

The LCD module 20 and/or transducer 14 can be coupled to the controller 16 using respective interface cable 21 and wire 21' or wirelessly. In that later case, the LCD module 20, transducer 14, and controller 16 are of course configured for that purpose.

Since ultrasound transducers and corresponding driving electronics configured to operate the transducer in pulse and echo mode are believed to be well-known in the art, they will not be described herein in more detail.

As will now be described, the mounting assembly 18 so positions the transducer 14 relatively to the tank 11 that the level of liquid in the tank 11 is measured from its bottom.

The mounting assembly 18 includes a ring-shaped body 22 having a central aperture 23, which houses the transducer 14. The mounting assembly 18 further includes biasing elements, in the form of springs 26 (two shown) having their respective proximate end 25 secured to the body 22. The mounting assembly 18 finally includes a rubber layer 24 secured to the transducer 14 using for example an adhesive such as glue, the rubber layer 24 acting as a coupling material between the transducer 14 and the tank 11.

Figure 3:
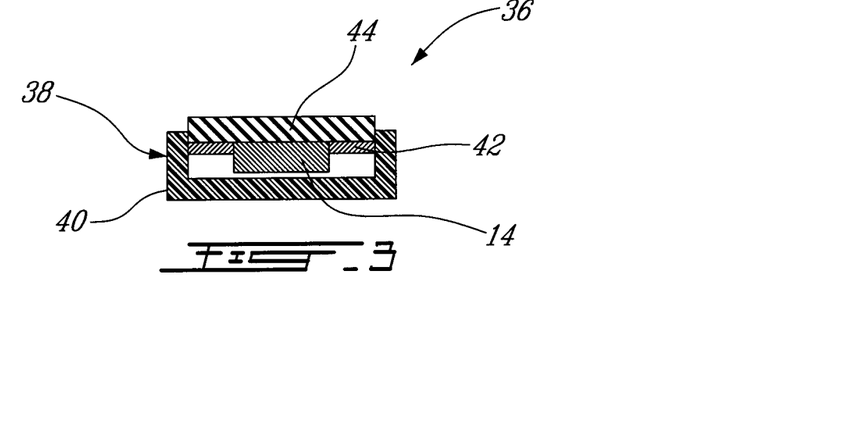
FIG. 3 is a level sensor assembly according to a second illustrative embodiment of the present invention.

The springs 26 allow biasing the transducer 14 upwardly so as to force a tight contact with the propane tank 11 through the rubber layer 24 when the tank 11 is positioned thereon (see FIG. 3). Of course, the length of the springs 26 is chosen so as to be greater than the height of the base 28 of the tank 11 so as to provide a close contact between the transducer 14 through the layer 24 and the tank 11.

Other biasing elements than the springs 26 can alternatively be used to provide a contact between the tank 11 and the transducer 14 sufficient to allow transmission of the ultrasound waves. For example the weight of the tank 11 can be sufficient in some applications, depending for example on the configuration of the tank 11 and/or of sensor assembly 12.

As will be appreciated by a person skilled in the art, providing a mounting assembly with springs 26 having a length sufficiently long allows using the same level sensor system 10 with propane tanks of different lengths.

The system 10 is removably secured to the tank 11 as follows. According to the first illustrative embodiment, the distal ends 30 of the springs 26 sit on the base 32 that receives the propane tank, while according to a further illustrative embodiment, the distal ends 30 of the springs 26 are secured to attachments (not shown) provided on the base 32 using fasteners (not shown).

The tank 11 is then positioned on the base 32, over the assembly 18. As described hereinabove, the tight ultrasound coupling between the transducer 14 and the tank 11 is ensured by the biasing elements 26 and the rubber layer 24.

The PCB 16 includes a magnetized mounting assembly 34 for its mounting onto the tank 11. According to this specific embodiment, the PCB 16 is further covered by a weatherproof material and is provided with a connector 17 which allows selectively disconnecting the LCD 20 from the PCB 16. Other fastening means, such as an adhesive or a strap-like assembly, can further be used to secure the mounting assembly 34 onto the tank 11.

According to the first illustrative embodiment, the LCD display unit 20 is intended to be connected to the controller 16 for selective level readings and therefore no coupling elements are provided to secure the unit 20 to the tank or else.

The display unit 20 can also be provided with fastening elements, such as magnets, for removably securing the unit onto the tank 11.

According to further illustrative embodiments of the present invention, the display unit 20 is part of the controller 16 which is coupled to the transducer 14 so as to be removable or not therefrom. The controller 16 can also be integral to the sensor assembly 12.

According to a further illustrative embodiment, the display unit 20 and/or controller 16 are permanently secured to the tank 11 or an element or object positioned adjacent thereto.

As mentioned hereinabove, the level sensor system 10 operates in pulse mode and therefore it operates in the time domain as will now be explained. The transducer 14 emits an ultrasound pulse towards the top of the tank 11. Ultrasound echoes are produced by the reflection of the pulse at the interface between the liquid in the tank 11 and the gas above or from the interface between two liquids. This ultrasound echo is received by the transducer 14 a certain time after the emission of the pulse, time which is indicative of the distance/height of the interface relatively to the bottom of the tank 11. Providing the type of liquid/the speed of sound and the time of flight, the height of the liquid above the transducer can be calculated as described hereinabove.

The echo signal produced by the transducer 14, which is indicative of the reflection of the ultrasound pulse on the liquid interface, is used by the controller 16 to determine the level of liquid in the tank 11 and/or any other quantity related to the level of liquid in the tank 11, such as the volume, or weight of fluid for example. According to a further illustrative embodiment of the present invention, this information is then transferred via cable, wire or wirelessly to another control unit for further processing and or display.

The controller 16 can further be programmed to frequently measure the level of liquid in the tank 11 so as to determine the rate of reduction in liquid and/or the flow rate and/or the amount of time left before the tank 11 becomes empty. This information can be displayed on the display unit 20.

As an illustrated method of determining the flow, the processing unit may increase the sampling rate; by storing the acquired levels corresponding to several measurements, the controller 16 can calculate the slope/rate of the change of liquid height vs time. This slope correlates to the consumption of the fluid. Based on the slope and the current level, which the system may translate to volume, the system calculates the rate of consumption of liquid in the tank. It may also calculate the amount of time left for consumption at the same average rate.

Providing the identity of a plurality of fluids in the tank 11 is known to the controller, the sensor system 10 can be used to measure the quantity of each the liquids in the tank 11, if they are not mixed, by determining the position of the interface between two adjacent liquids for example.

The ultrasound transducer assembly 14 is not limited to include a single transducer configured to emit ultrasound pulses and to receive ultrasound echoes. Two side by side emitter and receiver can also be used. Using such a pair of emitter/receiver allows reducing the minimum level that can be measured by the system. Other ultrasound transducers configurations can alternatively be used as will be described hereinbelow in more detail with reference to further illustrative embodiments.

According to still another illustrated embodiment of the present invention, the display unit can be replaced by a simpler visual alarm, such as a LED (light emitting diode) or by a sound alarm triggered, for example, by a press button, indicating to the user that a critical level has been reached.

Figure 1:
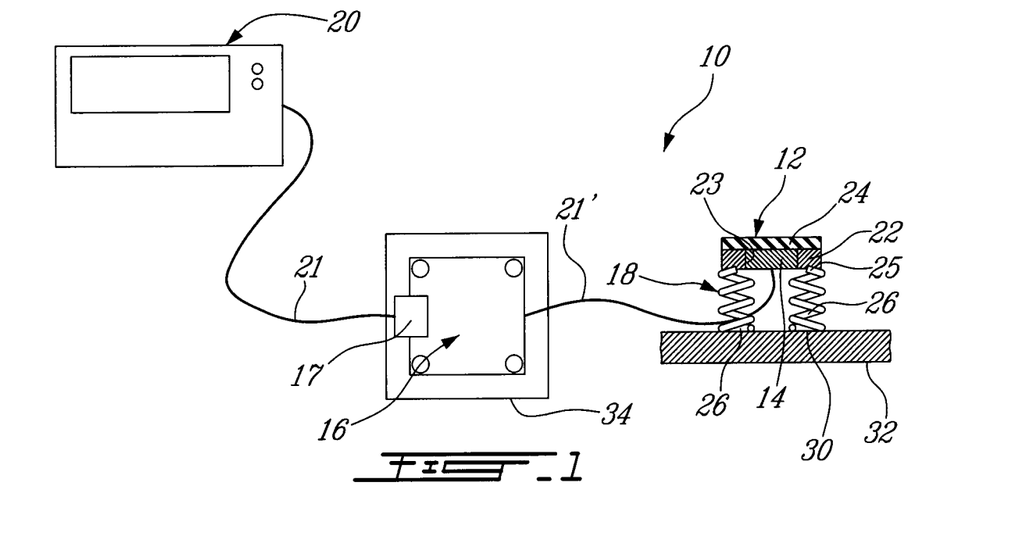
FIG. 1 is a schematic view of a level sensor system for measuring the level of propane in a conventional propane tank according to a first illustrative embodiment of the present invention.
Figure 2:
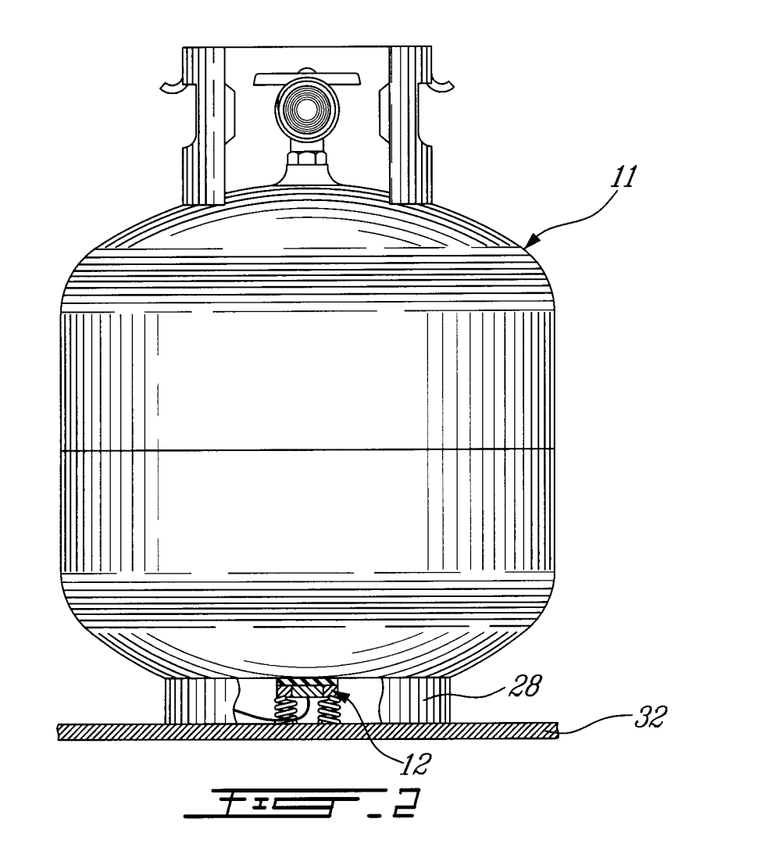
FIG. 2 is a schematic view of the sensor assembly part of the level sensor system from FIG. 1, the sensor assembly being illustrated positioned under a conventional propane tank so as to be operatively coupled thereto.

Also, the configuration and size of the mounting assembly may differ to the one illustrated in FIGS. 1 and 2. For example, the transducer 14 can be sandwiched between the rubber layer 24 and the body 22, which is not limited to having a ring shape.

As a person skilled in the art would appreciate, the rubber layer 24 together with the biasing elements 26 provide for a tight joint between the transducer 14 and the tank 11 when the tank 11 is removably positioned onto the sensor assembly 12. This tight connection allows for precise ultrasound measurements.

The rubber layer 24 can alternatively be made of another resilient material capable of transferring the acoustic wave and/or maintain good contact between the transducer assembly and the container.

Figure 4:
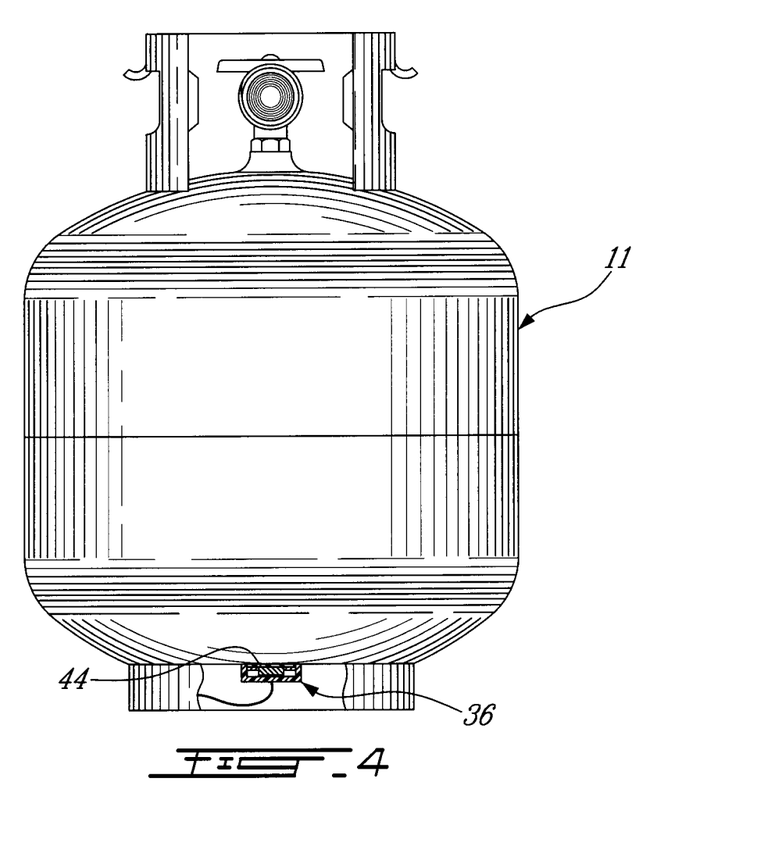
FIG. 4 is a schematic view of the sensor assembly from FIG. 3, illustrated positioned under a conventional propane tank so as to be operatively coupled thereto.

Turning now to FIGS. 3 and 4, a sensor assembly 36 according to a second illustrative embodiment of the present invention is illustrated.

The sensor assembly 36 comprises an ultrasound transducer 14 and a mounting assembly 38 for operatively mounting the transducer 14 to a tank 11 for level measurement.

The mounting assembly 38 includes a magnetized housing 40 and a ring-shaped body 42 for securing the transducer 14 to the housing 40. The mounting assembly 38 further includes a resilient and flexible layer 44 on top of the transducer 14 and the body 42. The layer 44, which can be made, for example, of rubber, acts as a coupling interface between the transducer 14 and the tank 11 as it has been described hereinabove.

When the assembly 36 is removably attached underneath the tank 11, the magnetic force between the housing 40 and the metal tank 11 forces the assembly 38 onto the tank 11 while compressing the rubber layer 44, thereby providing a tight coupling between the transducer 14 and the tank wall through the layer 44.

Even though the sensor assembly 36 is illustrated in FIG. 4 mounted to the bottom of the tank 11, the configuration and functionality of its mounting assembly allows its mounting to other portion of the tank 11, such as from the side. As a person skilled in the art would appreciate, the algorithm of the controller 16 has to be adapted according to the position of the sensor assembly. For example, the controller of a level sensor system according to the present invention having a sensor assembly 36 mounted on the side of the tank 11 (see for example in FIGS. 5A to 11) will have to be configured to operate in a switch mode, where the position of the sensor define the point of measurement and detects if the liquid or gas is at the level where the sensor is attached to the side of the tank. Example of level sensor assemblies configured to operate in switch mode according to further illustrative embodiments of the present invention will be described furtherin in more detail.

In switch mode, the sensor assembly 36 is mounted to the side tank 11, outside thereof or within the tank 11 as will be illustrated furtherin, for emitting an ultrasound pulse along a path generally parallel to the bottom of the tank 11 and for receiving ultrasound echoes incoming along the same path.

Figure 13:
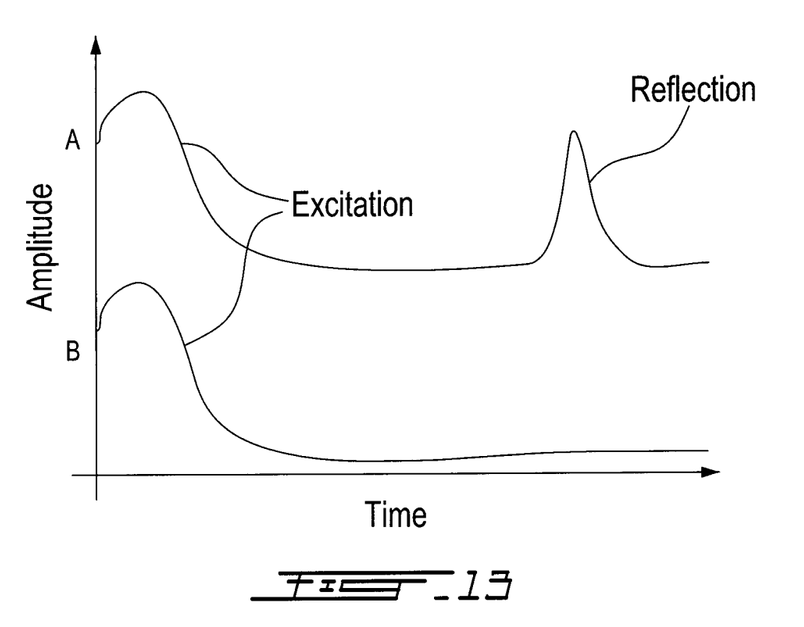
FIG. 13 is a graph illustrating representative signals when transducers of the systems from FIGS. 5A and 5B to 12 are immersed in a liquid (Curve A) or in a gas (Curve B).

In operation in switch mode, the sensor assembly produces a different signal depending on whether the ultrasound pulse travels in a first fluid, such as the liquid in the tank 11 (see FIG. 13, curve A for a representative output), in a second fluid, such as the gas above the liquid (see FIG. 13, curve B for a representative output). Since a known liquid will provide a reflection on the tank wall or on a target after a known delay following the initial excitation signal, providing the nature of the fluids in the tank 11, and the corresponding ultrasound signature, the sensor assembly can act as a digital level sensing switch for these fluids.

Even though the sensor assembly 36 has been illustrated as having a single transducer serving the purpose of both emitting the ultrasound pulses and receiving the reflected echoes, other configuration of transducer assemblies can also be used, including, without limitations, a pair of ultrasound emitter and receiver.

Figure 5A:
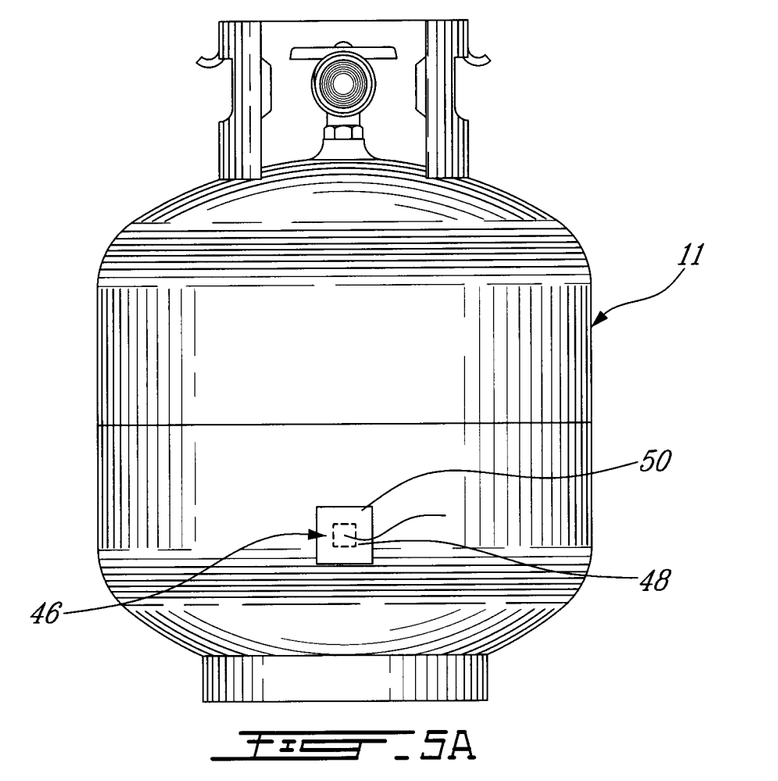
FIG. 5A is a level sensor assembly according to a third illustrative embodiment of the present invention; the sensor assembly being illustrated mounted on the side of a conventional propane tank so as to be operatively coupled thereto.
Figure 5B:
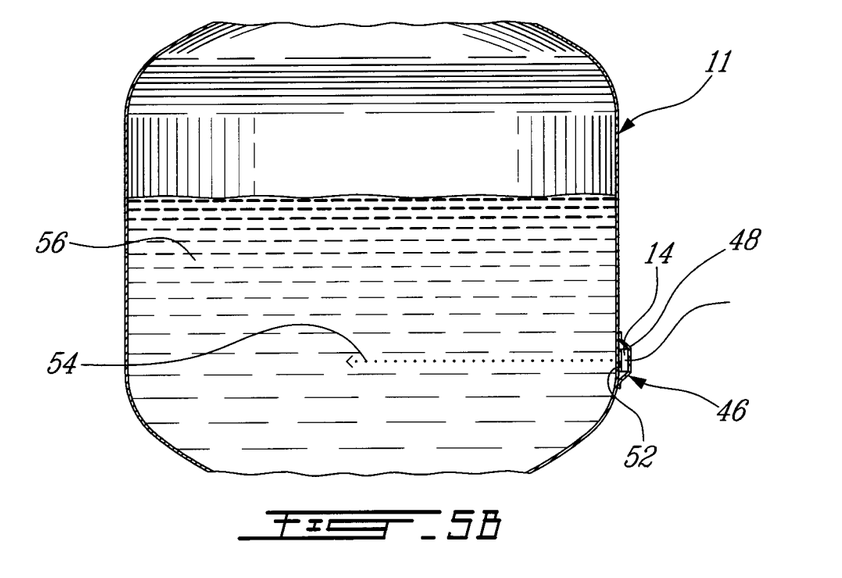
FIG. 5B is a schematic partially sectional view of the sensor assembly from FIG. 5A.

An example of sensor assembly 46 attached to the tank 11 for operation in switch mode is illustrated in FIGS. 5A-5B.

The sensor assembly 46 comprises a transducer assembly, including a single transducer 14 and a mounting assembly, including an embossed plate 48. The embossed plate 48 defines a central housing to receive the transducer 14 and a peripheral section 50 to secure the mounting assembly 48 to the tank, using fasteners or an adhesive to permanently or removable secure the sensor assembly 46 to the tank 11. According to a further illustrative embodiment (not shown), the peripheral portion of the plate 48 can be magnetized so as to allow its coupling to the metallic tank 11.

The sensor assembly 46 further includes a compressible liner 52 to provide a tight joint between the transducer 14 and the tank 11 as described hereinabove.

The transducer 14 is so mounted in the mounting plate 48 and the mounting plate is so mounted to the tank 11 onto the outside wall adjacent the bottom thereof that the ultrasound pulse 54 is emitted generally parallel the bottom of the tank 11 at the level where one wishes to detect.

A level sensor system according to a third illustrative embodiment of the present invention (not shown), which is equipped with the sensor assembly 46 and is configured to operate in switch mode, includes a controller configured to recognize the ultrasound signature of the liquid 56 in the tank 11 and may therefore detect a liquid when the level thereof reaches below the level of the sensor assembly 46. Curve A of FIG. 13 is a representative output when there is liquid in front of the sensor assembly 46 and curve B of FIG. 13 represents an output when there is gas in front of the sensor assembly 46. In the case of multiple liquids in the tank 11, the position of the reflection signal, time is indicative of the type of liquid/liquid mixture in front of the sensor assembly 46.

The configuration and size of the mounting plate 48 may of course be different than the one illustrated in FIGS. 5A and 5B. It can for example be adapted for the shape and size of the transducer assembly.

The transducer 14 is coupled to a controller and may include a display unit as described hereinabove.

It is to be noted that the precision of the measurement of the sensor assembly 46 depends on the size of the transducer 14.

Figure 6:
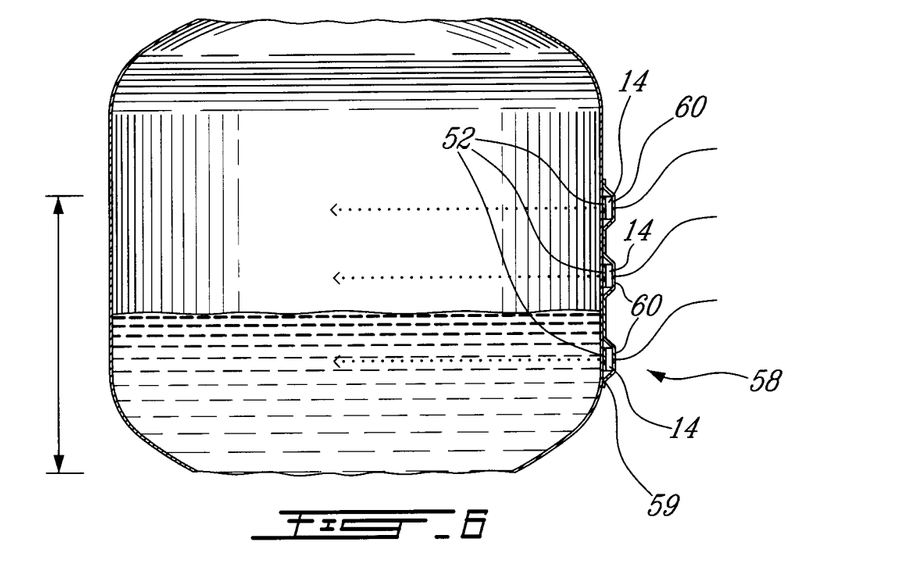
FIG. 6 is a schematic partially sectional view of a sensor assembly according to a fourth illustrative embodiment of the present invention; the assembly being illustrated mounted on the side of a conventional propane tank so as to be operatively coupled thereto.

As can be seen in FIG. 6, illustrating a sensor assembly 58 according to a fourth illustrative embodiment of the present invention, a plurality of transducers 14 can be mounted on the outside surface of the tank at different positions along its height, using a mounting assembly 59 in the form for example of an elongated plate having embossed portions 60, each defining a transducer housing as described with reference to FIGS. 5A and 5B. Each housing 60 includes a compressible liner 52.

The sensor assembly 58 allows sequentially detecting when the liquid level reaches each of three different heights in the tank 11, corresponding to the position of the transducers 14. Similarly to the transducer 14 in FIGS. 5A-5B, the transducer 14 is positioned relatively to emit a ultrasound pulse 54 generally parallel the bottom of the tank 11.

Similarly to the assembly 46 in FIGS. 5A-5B, the assembly 58 can be removably mounted to the tank 11 or permanently attached thereto.

The accuracy of the measurement of the sensor assembly 58 depends on the number of transducers 14 and on the distance between them since no detection occurs between two adjacent transducers 14.

Figure 7:
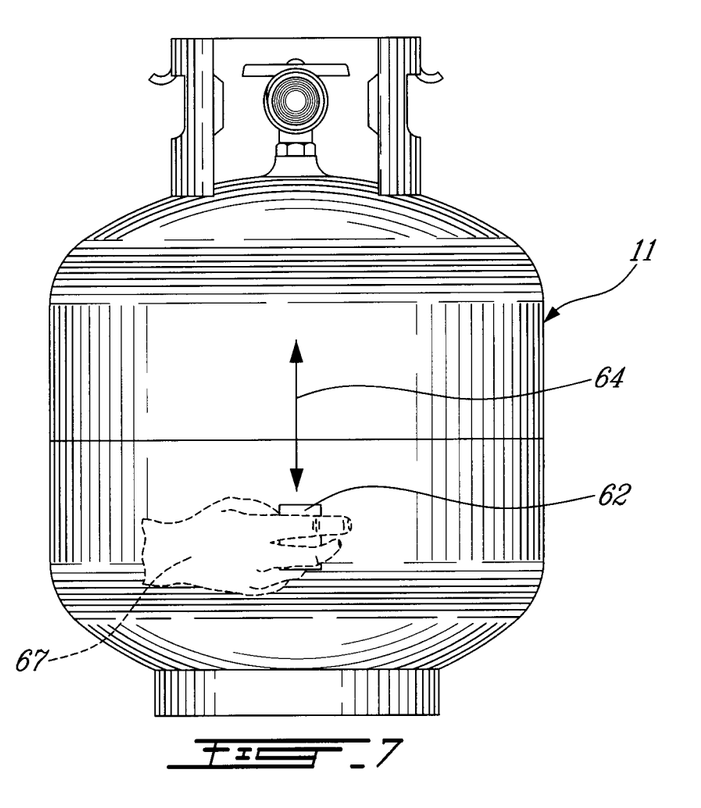
FIG. 7 is a schematic view of a sensor assembly according to a sixth illustrative embodiment of the present invention; the assembly being illustrated in operation as it is moved along the side of a conventional propane tank, operatively coupled thereto.

FIG. 7 shows a level sensor assembly 62 according to a fifth illustrative embodiment of the present invention. As it is the case for the sensor assembly according to the other illustrative embodiments according to the present invention shown herein, the sensor assembly 62 is to be coupled to a controller 16 having an output device coupled thereto, such as an LCD display 20, defining a level sensor system according to the present invention.

Since the sensor assembly 62 is similar to the assembly 36, and for concision purposes, only the differences between the two assemblies 62 and 36 will be described herein in further detail.

The sensor assembly 62 is intended to be moved on the surface of the tank 11 along its height (see arrow 64) while ensuring that the side of the assembly 62 provided with the liner is pressed upon the surface of the tank 11 for better transmission and reception of the ultrasound waves through the tank 11.

To minimize friction between the assembly 62 and the tank 11 and therefore to ease its movement thereon, the liner is made of a friction reducing material such as Teflon™. According to an alternative embodiment, a gel is used to reduce friction.

As mentioned hereinabove, the assembly 62 is part of a level sensor system according to an illustrative embodiment of the present invention.

In operation, the operator, which is represented by the hand 67 on FIG. 7, moves the sensor assembly along the height of the tank 11 (see arrow 64) until a display unit (not shown) or any other output unit connected to the controller (also not shown) interactively informs the user that the sensor assembly is then positioned at the same level than the interface between the liquid in the tank 11 and the gas above it as described hereinabove. The controller is of course configured to recognize such an interface as also described hereinabove (see FIG. 13). More specifically, when a 'reflection' is detected (see curve A in FIG. 13), the system recognizes that the liquid level is above the assembly 62 and interactively informs the user thereof. The time of flight is indicative of the liquid type.

As will now be described with reference to further illustrative embodiments of the present invention, sensor level assemblies according to the present invention are not limited to be positioned outside the tank 11 or used with conventional propane tanks, such as those used for BBQ.

Figure 8:
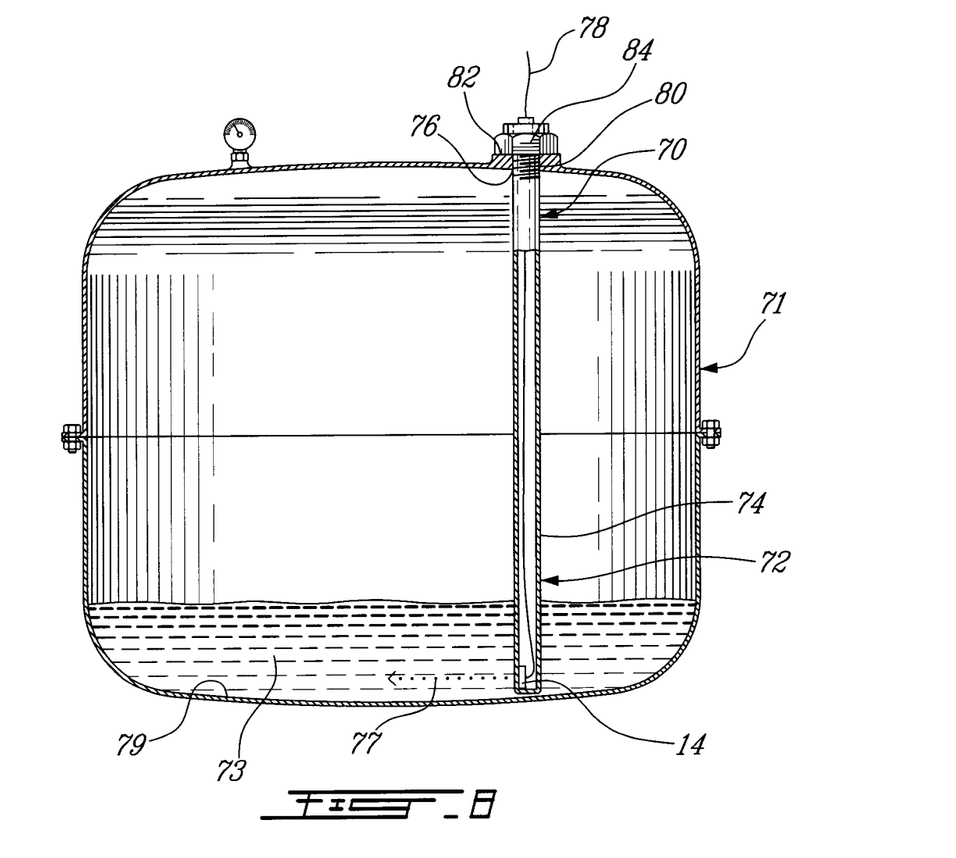
FIG. 8 is a schematic sectional view of a sensor assembly according to a seventh illustrative embodiment of the present invention; the assembly being illustrated mounted in a conventional propane tank, where the transducer is inside a housing protected from the liquid.

FIG. 8 illustrates a sensor assembly for a level sensor system according to a sixth illustrative embodiment of the present invention.

Such an assembly can be used for example in a big tank 71 where the reflected signal on the tank wall can be weak.

The sensor assembly 70 comprises a transducer assembly, including a single transducer 14 coupled to a controller as described hereinabove for example with reference to FIG. 1 (not shown), and a mounting assembly 72 for operatively mounting the transducer 14 within the tank 71 to operate in a switch mode. The sensor assembly 70 is illustrated mounted to a conventional pressure tank 71 filled with a pressurized gas in liquid form 73.

The mounting assembly is in the form of a hollow cylinder 74 sealed at the bottom and inserted in an aperture 76 in the tank 71 so as to be positioned generally perpendicular to the bottom 79 of the tank 71, the hollow cylinder 74 defining a dip-stick. The transducer 14 is mounted to the cylinder 74 therein so as to emit an ultrasound pulse 77 generally parallel the bottom 79 of the tank 71.

The transducer 14 is positioned adjacent or at the bottom of the cylinder 74 and the cylinder 74 extends to the bottom 79 of the tank 71 so that the detection occurs as close as possible to the bottom 79 of the tank 71.

Of course, the present invention does not limit the position of the transducer 14 in or outside the tank 71 relatively to the bottom 79 thereof.

The cylinder 74 is a made of a material capable of withstanding the pressure in the tank 71 and to resist to any corrosive fluid that can be present therein.

The cylinder 74 includes a threaded portion 80 for its mounting to a shoulder portion 82 of the tank 71 around the aperture 76. A nut assembly 84 is also used to further secure the dip-stick 74 to the tank 71. Further means can be used to secure the dipstick 74 into the tank 71 removably or not.

A mounting assembly having other configuration than the one illustrated in FIG. 8, allowing to operatively mounting the transducer 14 in the tank 71, can alternatively be used. The present invention is not limited to a dip-stick having a cylindrical shape.

The cylinder 74 allows protecting the transducer assembly 74 from the environment in the tank 71. Depending on the application, the controller can be inserted in the dip-stick 74 (see for example in FIG. 10) or the transducer 74 can be coupled thereto using conventional wiring 78.

Figure 9:
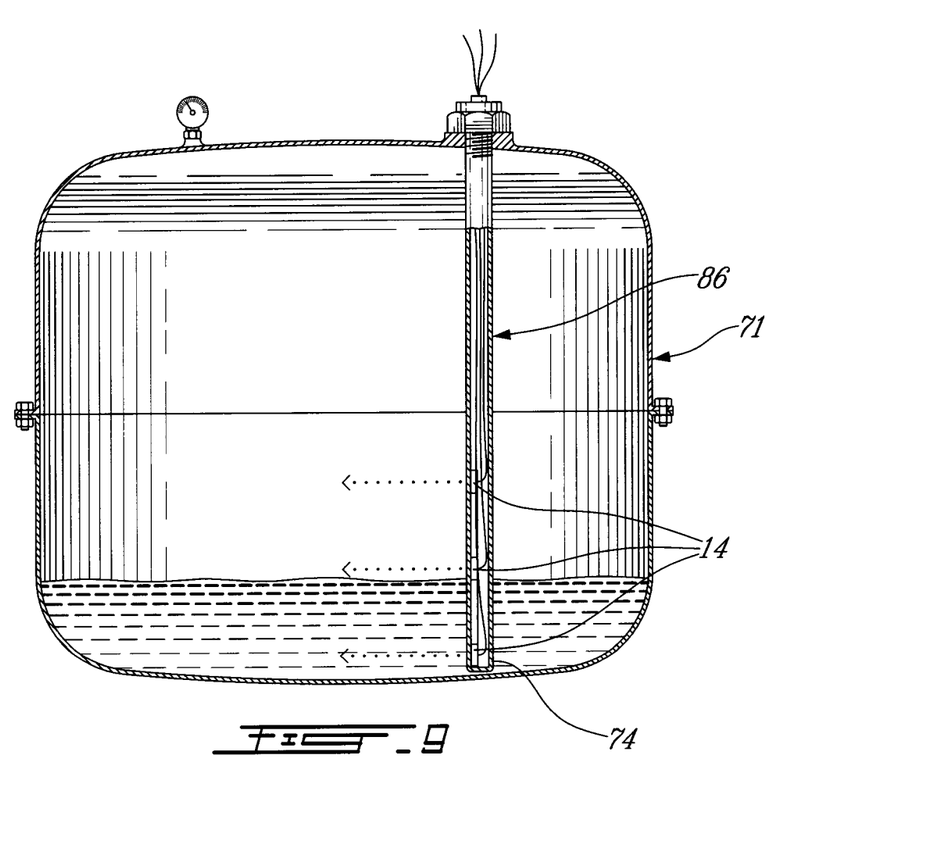
FIG. 9 is a schematic sectional view of a sensor assembly according to an eight illustrative embodiment of the present invention; the assembly being illustrated mounted in a conventional propane tank.

FIG. 9 illustrates a sensor assembly 86 according to a seventh illustrative embodiment of the present invention. Since the assembly 86 is very similar to the assembly 70, and for concision purposes, only the differences between the two assemblies 86 and 70 will be described herein in more detail.

The assembly 86 includes a plurality of transducers 14 (three shown) mounted to the dip-stick 74 therein. Similarly to the assembly 58 in FIG. 6, the sensor assembly 86 allows sequentially detecting when the liquid level reaches each of three different heights in the tank 71, corresponding to the three longitudinal positions of the transducers 14 in the tank 71.

The number and positions of the transducers 14 along the height of the cylinder 74 may of course vary to yield different detecting positions.

Moreover, a person skilled in the art would appreciate that the three transducers 14 does not have to be mounted to the cylinder 74 so that their pulses are oriented in the same direction, as long as they are substantially parallel.

Figure 10:
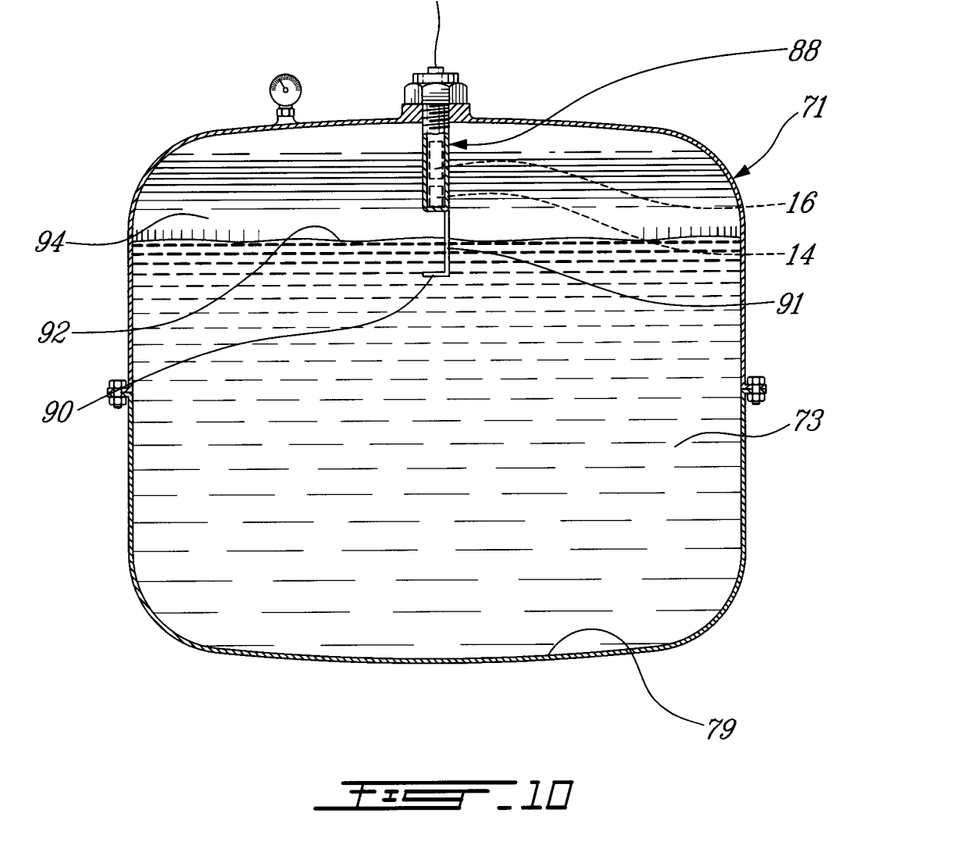
Figure 11:
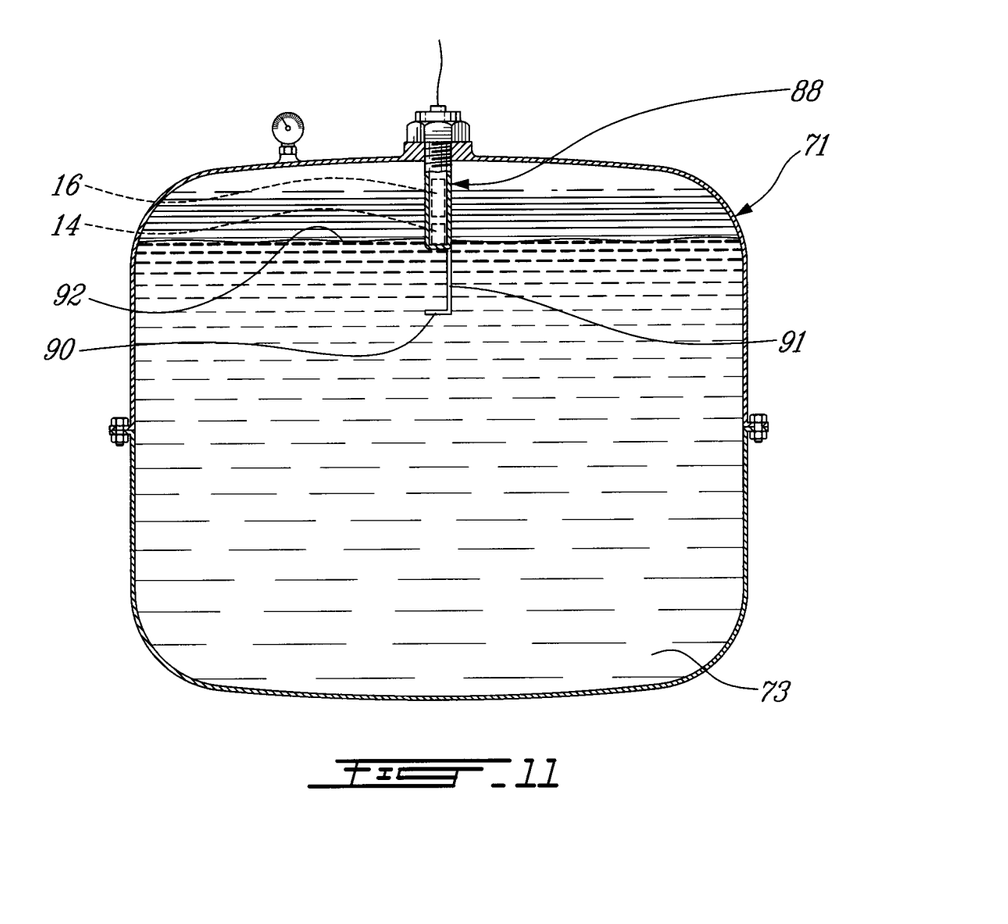

FIGS. 10 and 11 shows a level sensor assembly 88 for a level sensor system according to an eight illustrative embodiment of the present invention. Since the assembly 88 is similar to the assembly 72 in FIG. 8, and for concision purposes, only the differences between the two assemblies 88 and 72 will now be described in more detail. As will become apparent upon reading the following description, the assembly 88 acts as a fill stop detector to determine a maximum level to fill up the tank 71.

In addition to the transducer 14, the cylinder 74 further includes the controller 16 part of the level sensor system.

Also, the sensor assembly 88 includes an ultrasound reflector 90 mounted to the cylinder 74 outside thereof so as to be in the line of path of the ultrasound pulse emitted by the transducer 14.

As can be seen from FIGS. 10 and 11, because of the ultrasound high attenuation in the gas (see curve B in FIG. 13), the transducer 14 does not receive any reflection corresponding to the target 90 (or from the tank wall) until the liquid has reached the level of the transducer's face. The assembly 88 therefore allows detecting when the liquid 73 reaches the height of the transducer 14. A signal similar to the curve A in FIG. 13 is then obtained.

The reflector 90 is mounted to the cylinder 74 via a frame element, such as a rod 91. The distance between the reflector 90 and cylinder's end may vary, but is sufficiently close to the transducer 14 to allow enough intensity to reach the transducer 14.

In some application, the bottom wall 79 of the tank 71 acts as the target. However, providing a target closer to the transducer 14 allows better prediction of the reflection, therefore reducing the occurrence of false detections.

The configuration, shape, distance and material of the reflector 90 may of course vary than those illustrated.

As can be seen in FIG. 13 and as described hereinabove with reference to FIGS. 5A to 12, the level sensor assembly 88 allows operating in the time domain. More specifically, with reference to FIG. 13, an echo is received after a time "T", which corresponds to the delay between the ultrasound excitation pulse being reflected on the reflector 90.

Curve A of FIG. 13 is a representative output of a liquid covering the space between the transducer and the reference target. Curve B of FIG. 13 is a representative output signal resulting when there is no liquid covering the gap between the transducer and the reference target. Using a reflector, which can be for example be the bottom of the tank or one of its walls, and knowing the identity of the liquid in the tank, allows determining whether the transducer is immersed in the liquid or in a gas thereabove. The use of a time window allows reducing false detections.

Figure 12:
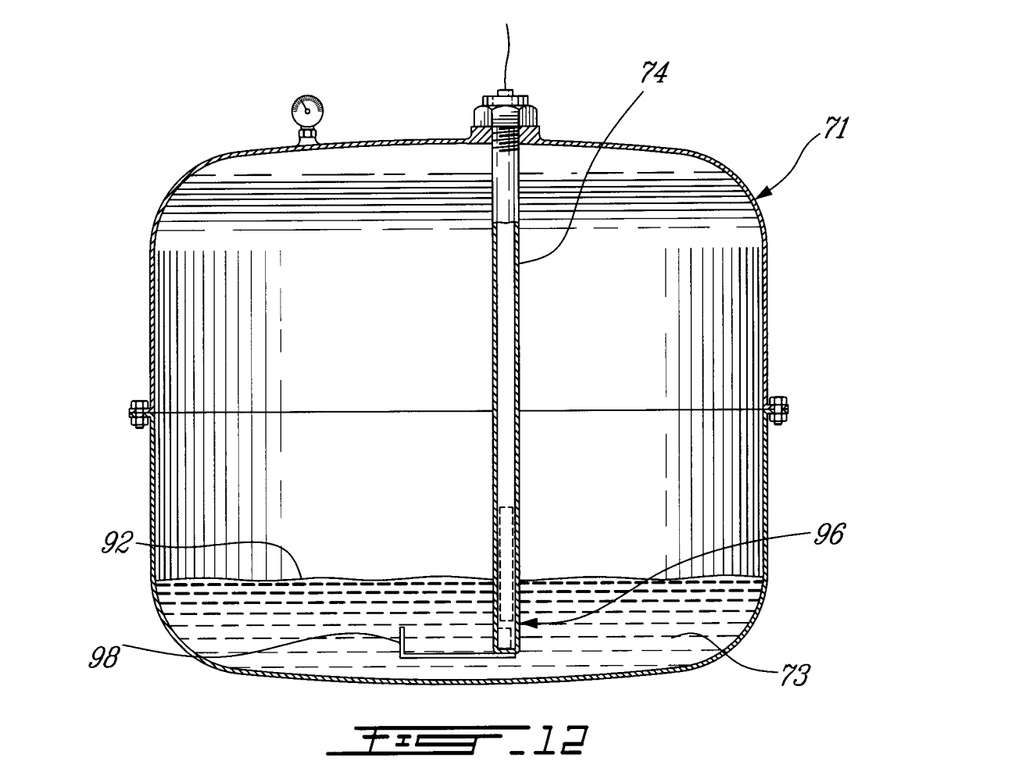
FIG. 12 is a schematic sectional view of a sensor assembly according to a tenth illustrative embodiment of the present invention, illustrating the use of a reflector perpendicular to the emptying axis of the tank.

Turning now to FIG. 12 a sensor assembly 96 according to a tenth illustrative embodiment of the present invention will now be described. Since most of the structural aspects of the assembly 96 are similar to those of the assembly 72 in FIG. 8, and for concision purposes, only the structural and functional differences between these two assemblies 96 and 72 will be described herein in more detail.

Similarly to the assembly 72 in FIG. 8, the sensor assembly 96 allows detecting the liquid level in a switch mode.

A first difference between the assemblies 96 and 72 is that the dip-stick 74 houses the controller 16.

A further difference between the two assemblies 96 and 72 is that the assembly 96 includes a reference target 98, which is used to improve the reflected signal quality to compensate for constrains of the tank 71, such as distance of the wall or non reflective walls, etc.

It is to be noted that many modifications could be made to the sensor level systems described hereinabove for example:
  when the sensor assembly includes more than one transducer part of a sensor level system to be operated in switch mode, each transducer can be coupled to an independent controller configured as described hereinabove or all the transducers can be coupled to a single controller which is then configured to check and discriminate between the return signals received from all the transducers so as to determine the level corresponding to a detected change in said signals;
  the liquid mixture in the tank can further be determined by the controller providing the change in the speed of sound for different mixtures and the distance between the transducer and the tank wall facing the transducer;
  the output device coupled to the controller can be in the form of a communication device that informs the user of the level of a relative information, such as a low level is reached. The controller or electronics can for example be configured to emit a distinctive sound when the fluid level reaches a predetermined level.

Even though level sensor systems and assemblies according to the present invention have been described in applications for measuring level in a propane tank or more generally in a pressurized tank, they can also be used in a tank including corrosive liquids and/or gases.

It is to be understood that the invention is not limited in its application to the details of construction and parts illustrated in the accompanying drawings and described hereinabove. The invention is capable of other embodiments and of being practiced in various ways. It is also to be understood that the phraseology or terminology used herein is for the purpose of description and not limitation. Hence, although the present invention has been described hereinabove by way of illustrative embodiments thereof, it can be modified, without departing from the spirit, scope and nature of the subject invention as defined in the appended claims.

What is claimed is:

1. A level sensor assembly for measuring the level of a liquid in a tank, the liquid defining a fluid interface with another fluid, the system comprising:

an ultrasound transducer assembly for emitting ultrasound pulses in the tank, along at least one detecting path, for receiving ultrasound echoes indicative of at a reflection of the ultrasound pulses from a surface within the liquid and for producing echo signals indicative of the fluid interface;

a mounting assembly that is removably attachable to the tank outside thereof for operatively and removably mounting in a quick connect manner the ultrasound transducer assembly to the tank outside thereof for ultrasound measurement;

the mounting assembly including a resilient contact layer mounted to the transducer assembly within the at least one detecting path for contacting the tank when the level sensor assembly is mounted thereto, yielding a tight coupling between the transducer assembly and the tank that allows transmission of ultrasound waves from the ultrasound transducer assembly through the tank; wherein the resilient contact layer is in the form of a deformable liner secured to the transducer assembly; the mounting assembly further comprising a housing body that houses the ultrasound transducer assembly therein, and a biasing element secured to the housing body for forcing a compression of the transducer assembly onto the tank via the deformable liner when the mounting assembly is mounted to the tank; and a controller coupled to the ultrasound transducer assembly for receiving the echo signals and for determining a position of the fluid interface therewith; the level of the liquid being defined by the position of the fluid interface.

2. A level sensor assembly as recited in claim 1, wherein the ultrasound transducer assembly including at least one ultrasound transducer for emitting the ultrasound pulses and for receiving the ultrasound echoes; the at least one ultrasound transducer being mounted to the tank via the mounting assembly so as to yield the tight coupling.

3. A level sensor assembly as recited in claim 1, wherein the tank includes a bottom; the mounting assembly operatively mounting the ultrasound transducer assembly to the bottom of the tank so that the ultrasound transducer assembly emits the ultrasound pulses from the bottom of the tank towards the top therefrom and receives the ultrasound echoes reflected from the interface after a time representative of the level of the liquid in the tank.

4. A level sensor system as recited in claim 1, further comprising an output device coupled to the controller for outputting information related to the position of the fluid interface.

5. A level sensor system as recited in claim 1, wherein the controller is further programmed to frequently determine the position of the fluid interface.

6. A level sensor assembly as recited in claim 1, wherein the biasing element is so mounted to the housing relative to a base as to force the compression of the transducer assembly onto the tank when the tank sits on the base.

7. A level sensor assembly as recited in claim 6, wherein the biasing element includes at least one spring.

8. A level sensor assembly as recited in claim 1, wherein the biasing element includes a magnet.

9. A level sensor assembly as recited in claim 2, wherein the tank includes a bottom; the mounting assembly mounting the at least one transducer for emitting the ultrasound pulses in the tank along the at least one detecting path which is generally parallel to the bottom of the tank at a position relatively therefrom;

whereby each of the at least one transducer acting as a level switch, wherein the ultrasound echoes indicative of the reflection of the ultrasound pulses within the liquid are received by the transducer whenever the liquid level is at least equal or higher than the position of the transducer.

10. A level sensor assembly as recited in claim 9, wherein the at least one ultrasound transducer includes a plurality of transducers each mounted to the tank via the mounting assembly at a respective position relatively to the bottom of the tank along the height thereof.

11. A level sensor system as recited in claim 1, wherein the controller determining a position of the fluid interface includes computing a delay between the ultrasound transducer emitting one of the ultrasound pulses and the ultrasound transducer receiving a corresponding one of the echo signals indicative of the reflection of the ultrasound pulses from the surface within the liquid.

* * * * *